UNITED STATES PATENT OFFICE.

SAMUEL PEACOCK, OF CHICAGO, ILLINOIS.

PROCESS OF RENDERING COMMERCIAL SALTS NON-DELIQUESCENT.

1,009,560.  Specification of Letters Patent. Patented Nov. 21, 1911.

No Drawing. Application filed June 17, 1911. Serial No. 633,836.

*To all whom it may concern:*

Be it known that I, SAMUEL PEACOCK, a citizen of the United States, residing at Chicago, in the county of Cook and State of Illinois, have invented certain new and useful Improvements in Processes of Rendering Commercial Salts Non-Deliquescent; and I do hereby declare the following to be a full, clear, and exact description of the invention, such as will enable others skilled in the art to which it appertains to make and use the same.

This invention relates to a process of rendering commercial salts non-deliquescent, and has for its especial object to provide a simple and inexpensive method by which certain salts of commerce may be prevented from absorbing moisture, and thereupon corroding or otherwise injuring their containers during storage and shipping.

To these ends the invention consists in the novel steps constituting my process more fully hereinafter disclosed, and particularly pointed out in the claims.

As is well known, there are a number of commercial salts which are deliquescent and normally moist only because they contain certain impurities that readily absorb water, the chemically pure salt being in itself non-deliquescent. The impurities themselves, however, usually contain a highly deliquescent salt, such as calcium chlorid or calcium nitrate, which cannot be wholly separated from the salt by only washing or other economical process heretofore known, so they are at present allowed to remain with the salt. Examples of such salts are nitrate of sodium containing small amounts of calcium nitrate, magnesium sulfate and magnesium chlorid, which latter salts are very deliquescent, as well as mono-calcium phosphate, containing small amounts of magnesium sulfate. Deliquescence is caused by the presence of these impurities, which, having a vapor pressure less than the pressure of water vapor in the air under ordinary conditions, slowly absorb water from the air.

According to my invention, I remedy this condition by treating the commercial salt thus contaminated with ammonia gas, and at such temperature approximately 180° C, so that no basic ammonia salts can exist. By this treatment deliquescent nitrate of calcium becomes nitrate of ammonia and calcium hydrate, magnesium chlorid becomes pure ammonium chlorid and magnesium hydrate, and calcium chlorid becomes pure ammonium chlorid and calcium hydrate. There are atmospheric conditions under which these latter compounds may absorb water from the air, but they are of such rare occurrence, that the solid phase is practically constantly maintained.

In practice, I prefer to pass the crude salts rendered as dry as convenient and heated to about 180° C., through an atmosphere of ammonia gas, contained in a suitable closed vessel provided with stirrers so that the gas may reach every particle of the salt. The deliquescent salts present are thus converted into ammonium salts and stable hydrates. This case it will be seen deals with salt impurities and differs from my copending application No. 633,835, filed June 17, 1911 and entitled process of rendering commercial salts non-corrosive in that said latter application deals with impurities containing a free acid.

What I claim is:—

1. The process of rendering commercial salts composed of non-deliquescent compounds mixed with impurities containing deliquescent salts non-deliquescent as a whole which consists in subjecting said commercial salts to the action of ammonia gas while at a temperature which prevents the formation of basic ammonia salts, substantially as described.

2. The process of rendering non-deliquescent as a whole commercial salts composed of non-deliquescent constituents mixed with impurities containing deliquescent salts, which consists in heating said commercial salts to a temperature of substantially 180° C., and while stirring the same subjecting them to the action of ammonia gas, substantially as described.

In testimony whereof, I affix my signature, in presence of two witnesses.

SAMUEL PEACOCK.

Witnesses:
EDWARD L. BASH,
S. HANNA.